United States Patent [19]

Bauer et al.

[11] Patent Number: 5,165,805
[45] Date of Patent: Nov. 24, 1992

[54] ROLLER BEARING CAGE

[75] Inventors: Bernard Bauer, Hassfurt; Klaus Kispert, Schweinfurt; Martin Schepp, Schweinfurt; Robert Stolz, Schweinfurt; Knut Mirring, Gochsheim, all of Fed. Rep. of Germany

[73] Assignee: SKF GmbH, Schweinfurt, Fed. Rep. of Germany

[21] Appl. No.: 711,447

[22] Filed: Jun. 6, 1991

[30] Foreign Application Priority Data

Sep. 6, 1990 [DE] Fed. Rep. of Germany ... 9006526[U]

[51] Int. Cl.⁵ ............................................. F16C 33/46
[52] U.S. Cl. .................................... 384/572; 384/526; 384/576
[58] Field of Search ............... 384/572, 576, 578, 526, 384/527, 534

[56] References Cited

U.S. PATENT DOCUMENTS

| 4,004,840 | 1/1977 | Johnston et al. | 384/526 |
| 4,235,487 | 11/1980 | Schard | 384/576 |
| 4,397,507 | 8/1983 | Kraus et al. | 384/576 |
| 5,044,787 | 9/1991 | Hupfer et al. | 384/576 |

Primary Examiner—Lenard A. Footland
Attorney, Agent, or Firm—Eugene E. Renz, Jr.

[57] ABSTRACT

Roller bearing cage, especially for cylindrical roller bearings or needle bearings, which presses the rolling elements elastically in the radial direction against a raceway to prevent rippling, characterized in that, at least at one point (6), the cage (1) has notches (8) proceeding from the end surfaces (10) and a connecting part (11), which is rigid in the peripheral direction and which is located between the notches; and in that, in the peripheral direction, a recess (9), extending approximately across the width of the cage, is provided on one or both sides next to notches (8), this recess forming the boundaries of elastic sections (12).

3 Claims, 1 Drawing Sheet

ROLLER BEARING CAGE

FIELD OF THE INVENTION

The present invention relates to cages for roller bearings particularly cylindrical roller bearings or needle bearings. The present invention relates particularly to improvements in bearings of the type wherein the rolling elements are pressed elastically in a radial direction against a raceway to prevent so-called "rippling".

BACKGROUND OF THE INVENTION

Roller bearing cages of the type generally discussed above are not new per se. For example, in accordance with West German registered design no. 77-16,113, a roller bearing cage is fabricated from an elastic material to include at least one slot at a point in its periphery which has peripheral projections on one of the two end surfaces. The projection rests with pretension against the opposite end surface which has a recess in the area of the projection. In this known roller bearing cage, the elastic travel is relatively small so that when the tolerances for the individual components are large, it has been found that the rolling elements cannot be held against the raceway with the necessary pretension. Furthermore, it has been found that the end surfaces shift radially with respect to one another and tend to snap over one another. By reason of this phenomenon it is difficult to install the cage with automatic equipment.

SUMMARY OF THE INVENTION

With the foregoing in mind, it is an object of the present invention to provide a roller bearing cage characterized by novel features of construction and arrangement which obviates the formation of ripples even when the tolerances for the individual components are large. In accordance with the present invention, this is accomplished by a structure making it impossible for the ends of the cage to shift with respect to each other either in the axial direction or angularly. To this end, in accordance with the present invention, the cage is provided with notches extending from the end surfaces at least at one point and providing a rigid connecting member in the peripheral direction between the notches. A recess is provided in the peripheral direction on one or both sides next to the notches which extends approximately across the width of the cage and defines the boundaries of the elastic sections. This cage can be manufactured efficiently and economically by casting or injection molding and lends itself to machine or automatic assembly and to this extent constitutes a significant improvement over the prior art.

In accordance with another feature of the present invention, relatively large radii are provided at the transitions between the elastic sections and the adjacent cage parts so that at these points it is impossible for cracks or fissures to develop which can lead to fracture and premature damage to the cage.

In the preferred embodiment of the invention, the elastic sections are in the shape of sinusoidal waves wherein the crests of the waves are aligned opposite each other as are the troughs defined between the crests. By this construction, a spring is defined with a relatively high degree of elasticity so that the rolling elements and the cage form in themselves an elastically cushioned unit. Consequently there is no impairment to the freedom of rotation of the shaft in either direction without loss of bearing play.

BRIEF DESCRIPTION OF THE DRAWING

These and other objects of the present invention and the various features and details of the operation and construction thereof are hereinafter more fully set forth with reference to the accompanying drawing, wherein.

DETAILED DESCRIPTION OF THE PREFERRED EMBODIMENT

Figure 1:
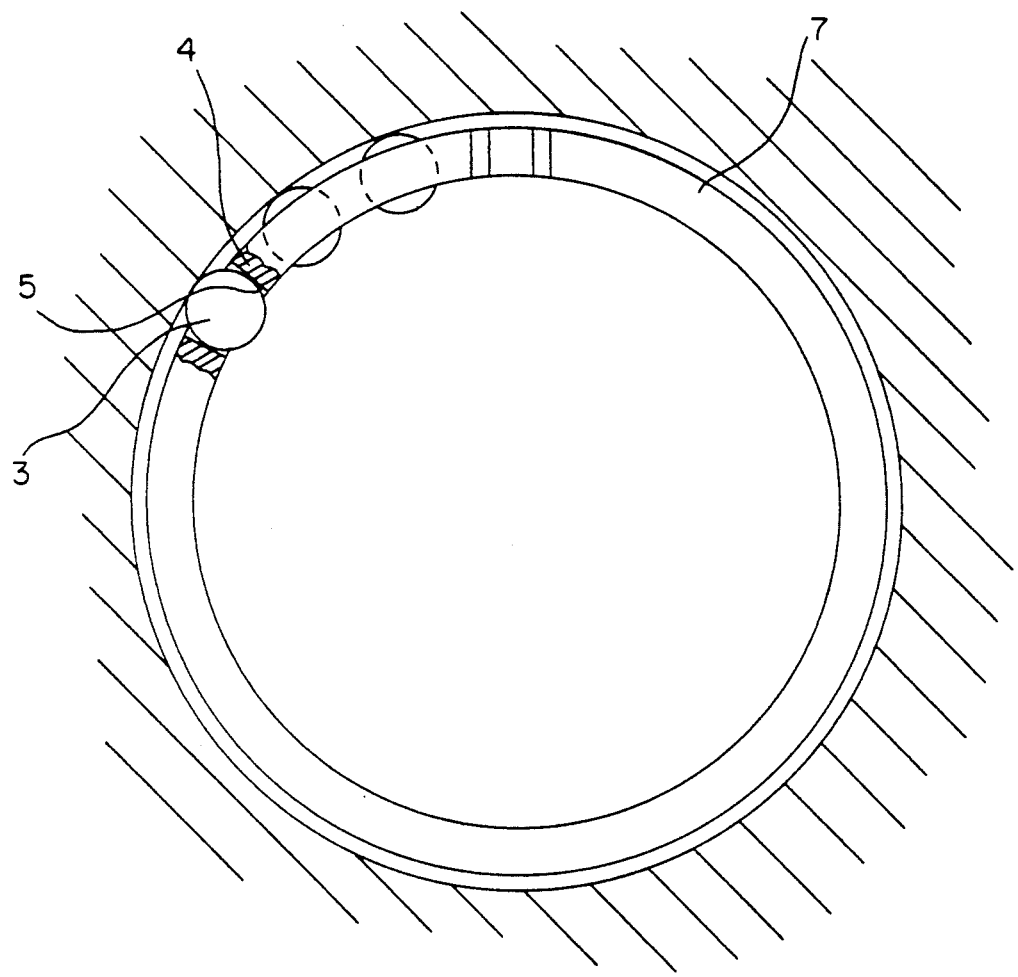
FIG. 1 is a side elevational view partly in section of a cage made in accordance with the present invention.
Figure 2:
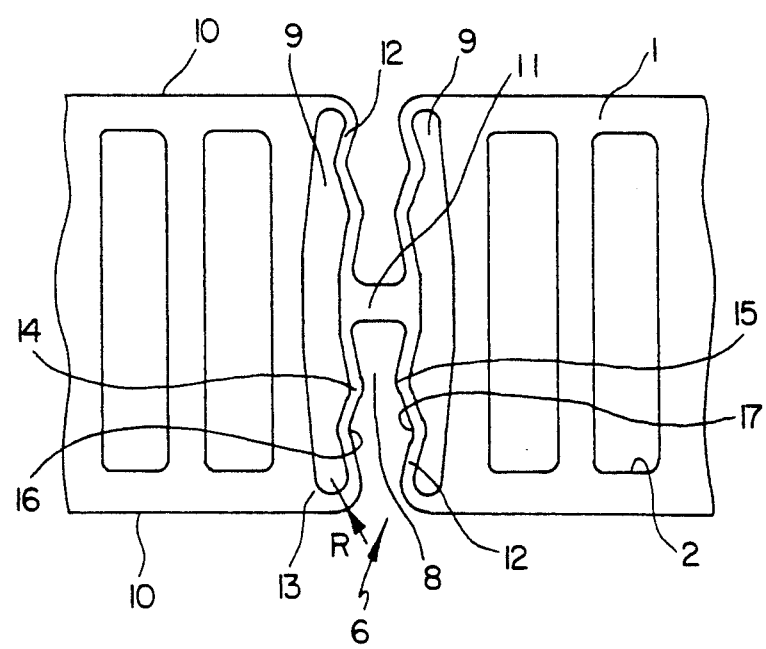
FIG. 2 is a enlarged developed top plane view showing the area of one of the elastic points.

Referring now to the drawing and particularly to FIGS. 1 and 2 thereof, there is shown a roller bearing cage generally designated by the numeral 1 which is made of an elastic material, such as plastic and has a series of generally rectangular circumferentially spaced pockets 2 for rolling elements 3. The rolling elements 3 are held at least radially inwardly and kept parallel to the axis and for this purpose, the cage webs 4 are provided with guide surfaces 5 located outside the pitch circle C and which are either curved or flat to conform to the lateral surface of the rolling elements 3. These guide surfaces contact the rolling elements 3 tangentially.

In accordance with the present invention, cage 1 is designed to be flexible or elastic in the peripheral direction at least at one point 6 about its periphery so that it functions to spring back and press rolling elements 3 radially against raceway 7 and simultaneously eliminates elastically the play of rolling elements 3 with respect to cage 1 so that rippling caused by vibrations in a stationary state is prevented. In the present instance, the elastic feature is designed into the cage by means of a notch and recess configuration defining, in the present instance, opposing relatively thin serpentine terminal end walls of the cage which are connected at their midpoint by a connecting bridge 11. With respect to FIG. 2, the notches 8 which extend axially inwardly from opposing peripheral side edges of the cage to a point where they form the boundary surfaces for the connecting bridge 11 which is of a width so that it is rigid in the peripheral direction. The elongated recesses 9 extend inboard from the peripheral edge of the cage to the opposite end to define elastic sections 12 formed integrally with the connecting bridge 11. The transition between the elastic sections 12 and the adjacent cage part 13 is radiused and is preferably of a relatively large radii R to ensure low notch stresses. Relatively large radii are provided at the transitions between elastic sections 12 and adjacent cage parts 13, so that the notch stresses are as small as possible at these points and thus no cracks can develop which would lead to the breaking-off of sections 12, which are relatively thin.

In accordance with the preferred arrangement, the elastic wall sections 12 are preferably of a serpentine sine curve cross section or in the form of waves having crests 14 and valleys 16 which are aligned with the opposing wave crest 15 and wave trough 17 of the opposing confronting elastic section. Accordingly when the cage ends are shifted in an axial direction or angularly relative to one another, these ends return to their original positions.

Because of the wave-shaped design of the elastic sections 12, a spring is obtained which has a relatively high degree of elasticity. The cage 1 is thus expanded, so that the rolling elements 3 are pressed radially against a raceway on one side and the freedom of the rolling elements 3 to move against the cage 1 is eliminated elastically on the other. "Grooving" occurs when there is play between the rolling elements and a cage or a bearing ring, and the rolling elements of a stationary bearing or of a bearing in which the rolling elements do not rotate relative to a raceway for a certain period of time are hammered in for example by vibrations.

While particular embodiments of the present invention have been illustrated and described herein, it is not intended to limit the invention and changes and modifications may be made therein within the scope of the following claims.

What is claimed is:

1. Roller bearing cage, which presses the rolling elements elastically in the radial direction against a raceway to prevent rippling, characterized in that, at least at one point (6), the cage (1) has notches (8) proceeding from the end surfaces (10) and a connecting part (11), which is rigid in the peripheral direction and which is located between the notches; and in that, in the peripheral direction, a recess (9), extending approximately across the width of the cage, is provided on one or both sides next to notches (8), this recess forming the boundaries of elastic sections (12).

2. Roller bearing cage according to claim 1, characterized in that relatively large radii (R) are provided at the transition between the elastic section (12) and the adjacent parts (13) of the cage 3. Roller bearing cage according to claim 1, characterized in that the elastic sections (12) ar designed in the form of waves, crests (14, 15) opposite crests and troughs (16, 17) opposite troughs

* * * * *